(Model.)

R. R. JAMES & M. N. LYNN.
GRAIN METER.

No. 246,141. Patented Aug. 23, 1881.

WITNESSES:
W. W. Hollingsworth
John S. Kenon

INVENTOR:
R. R. James
M. N. Lynn
BY
ATTORNEYS.

(Model.)

R. R. JAMES & M. N. LYNN.
GRAIN METER.

No. 246,141. Patented Aug. 23, 1881.

3 Sheets—Sheet 2.

WITNESSES:
W. W. Hollingsworth
[signature]

INVENTOR:
R. R. James
M. N. Lynn
BY [signature]
ATTORNEYS.

(Model.)
R. R. JAMES & M. N. LYNN.
GRAIN METER.
No. 246,141.   Patented Aug. 23, 1881.
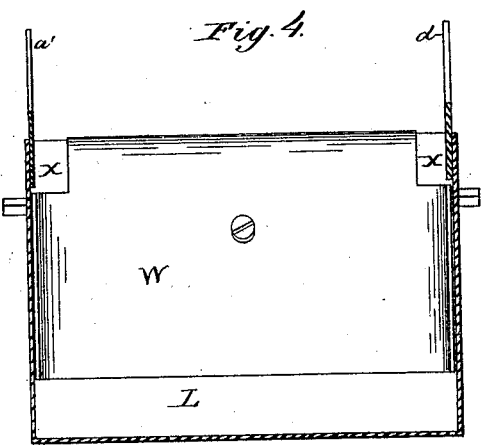
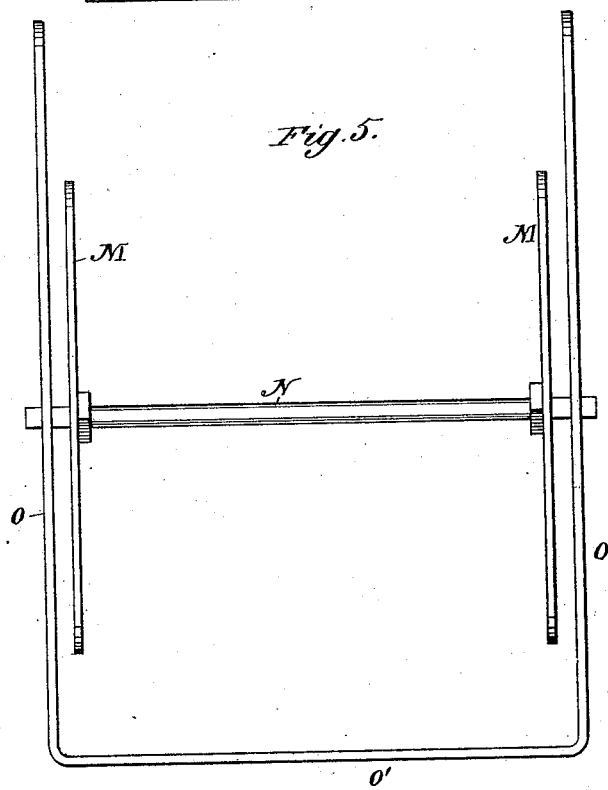

UNITED STATES PATENT OFFICE.

REUBEN R. JAMES AND MIRABEAU N. LYNN, OF RISING SUN, INDIANA; SAID LYNN ASSIGNOR OF ONE-HALF HIS RIGHT TO THE BRADFORD MILL COMPANY, OF CINCINNATI, OHIO.

GRAIN-METER.

SPECIFICATION forming part of Letters Patent No. 246,141, dated August 23, 1881.

Application filed April 13, 1881. (Model.)

*To all whom it may concern:*

Be it known that we, REUBEN R. JAMES and MIRABEAU N. LYNN, of Rising Sun, Ohio county, Indiana, have invented a new and useful Improvement in Grain-Meters; and we do hereby declare that the following is a full, clear, and exact description of the same, reference being had to the accompanying drawings, forming part of this specification, in which—

Figure 1:
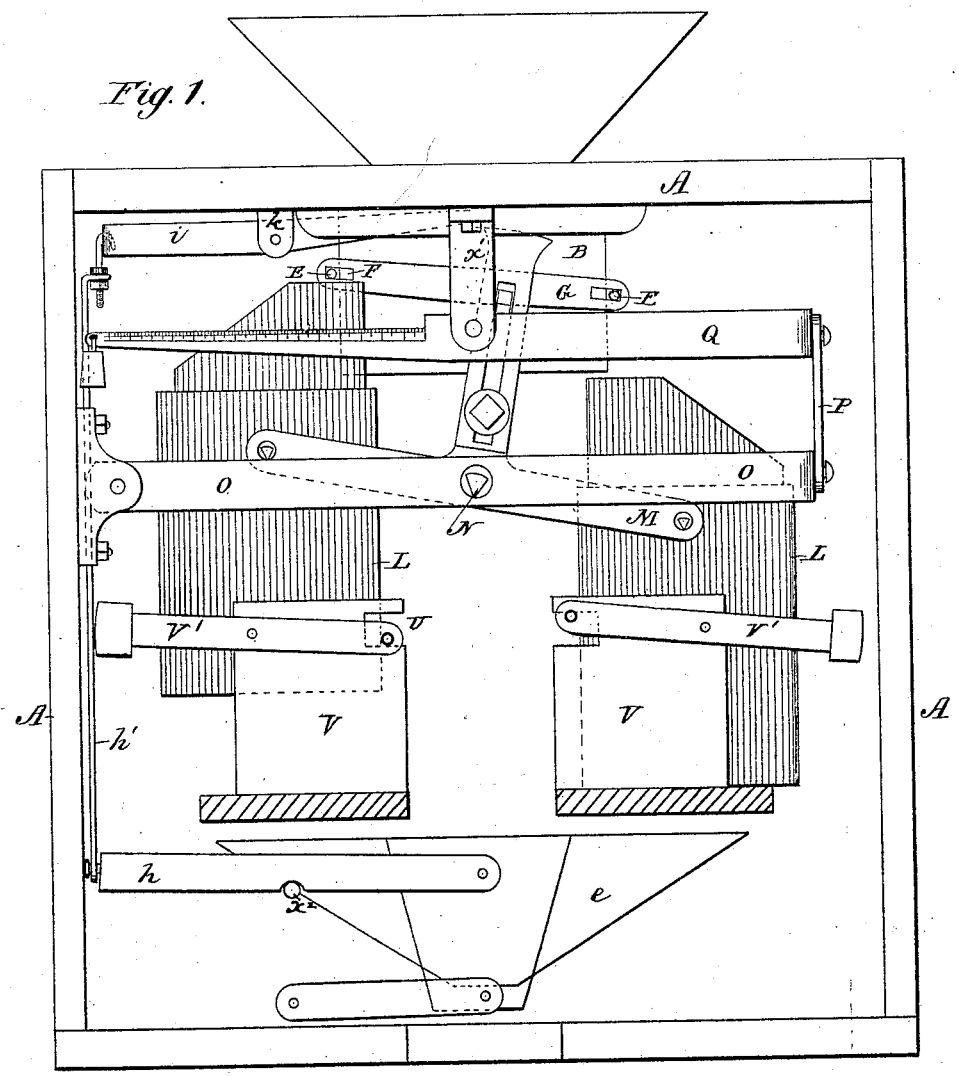
Figure 2:
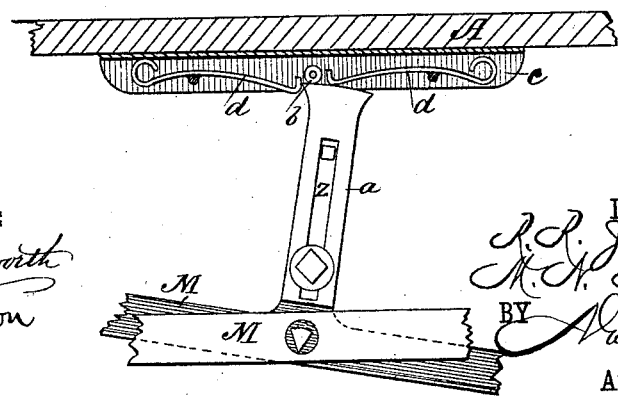
Figure 3:
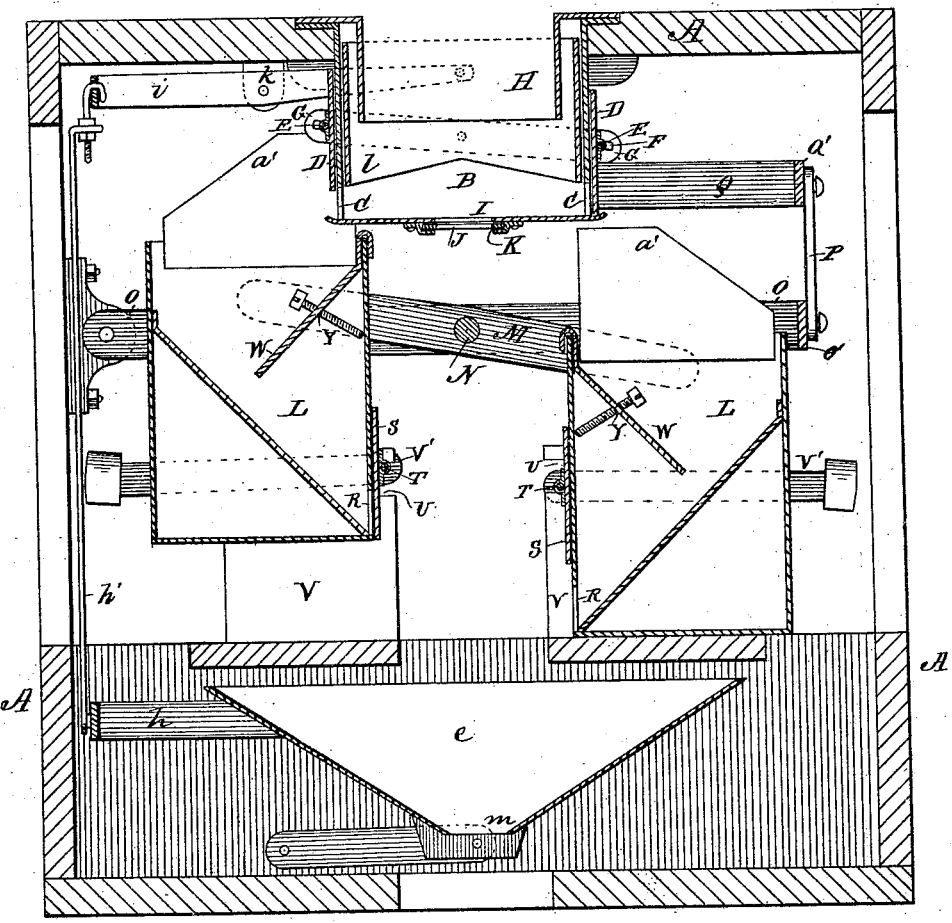
Figure 6:
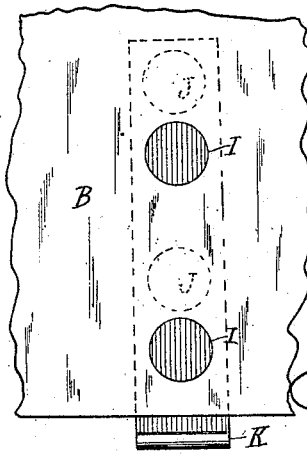

Figure 1 is a side elevation of our improved grain-meter with the side removed. Fig. 2 is a detail view of the locking device. Fig. 3 is a central vertical section of the grain-meter, and Figs. 4 and 5 are detail views. Fig. 6 is a top view of the bottom of the feed-hopper, showing the holes therein and the slide.

Our invention relates to apparatus for weighing and measuring the amount of grain that passes through it by devices actuated solely by the weight of the grain, and hence automatic in its operation; and the invention is an improvement on the grain-meter for which Letters Patent were granted to us February 22, 1881, No. 238,122; and it consists, first, in employing balanced weighing-buckets suspended from two balanced beams connected permanently together and supported upon two vibrating levers permanently connected together at their outer ends, so as to form a bail, and operated upon alternately by the weight of the grain in one of the buckets, and the weight of two scale-beams, also permanently connected with each other at their outer ends, so as to form a bail, and connected with the free ends of the vibrating levers, in lieu of employing a single balance-beam, a single vibrating lever, and a single scale-beam, as in the patent above referred to, whereby the buckets are more securely connected to act in unison with each other, are guided in their vertical movements by the bail form of the vibrating levers and scale-beams, and the construction is rendered more compact and less liable to get out of order.

Our invention further consists in the construction of the feed-hopper preferably rectangular in shape, arranged centrally under the top casing, with a rectangular cap or spout extending down into the mouth of the hopper, nearly to the upper edges of two longitudinal openings on each side of the hopper at its bottom, to allow the grain to pass to either bucket of the meter, which openings are provided with a gate to each, balanced on two cross-beams, one at either end of the hopper, and are so constructed that when one gate is closed the other is opened.

In order to prevent the grain from being choked in its passage through the discharge-opening, and thereby stop the further operation of the buckets, the invention further consists in suspending the discharge-hopper upon a vibrating bail, having its opposite side arms pivoted to the opposite sides of the casing, and its connecting end joined by a long counter-balance-weight to an upper bail pivoted in brackets secured to the under face of the top of the casing, the inner ends of the upper bail being pivoted to a rectangularly-shaped cut-off or sleeve having a vertically-reciprocating movement in the feed-hopper, and closing the side openings in the latter to prevent the outflow of grain when the discharge-hopper is too full, so that no more grain will be admitted to the weighing-buckets until the discharge-hopper shall have been relieved of its excessive weight.

Our invention further consists in providing each weighing-bucket with a partition hinged to one of the top edges of the bucket, and adjustable out and in from the back face of the bucket by set-screws or otherwise, whereby the capacity of the bucket above the partition, provided with openings for the escape of grain into the space below the partition, may be varied, and the grain allowed to bank up against the gate in the hopper immediately above the weighing-bucket, and thus prevent or retard the inflow of grain from the hopper into the weighing-bucket, the object to be attained being to get a small amount of grain to flow into the weighing-bucket at the time the weight on the scale-beams and the weight of the weighing-bucket are nearly balanced, so that too much grain will not be delivered into the weighing-bucket, and by means of the holes and space in the partition to continue the flow of grain until a sufficient quantity is introduced into the weighing-bucket to overbalance the weight on the scale-beam and allow the weighing-bucket to descend.

Our invention further consists in the construction and arrangement of devices whereby when one gate of the feed-hopper is opened the opposite gate is closed, the gate in the lower end of a weighing-bucket being closed when the gate of the feed-hopper over said weighing-bucket is open, as hereinafter more fully set forth.

In order to hold the weighing-bucket in its raised position until the full weight of grain has been admitted to the bucket, our invention further consists in securing to the upright arm of one of the balanced beams of the buckets an adjustable slotted T-shaped arm, provided with an enlarged curved end bearing against a friction-roll secured between two plates of sufficient length to admit of a stop or pawl on either side of the friction-roll, so that when the head of the T-shaped arm is interlocked with the friction-roll to hold up the bucket there will be no pressure on the roller.

Our invention finally consists of a sliding safety-gate in the bottom of the hopper, by means of which, if the weighing mechanism gets out of order, the grain can pass through the machine between the weighing-buckets and out through the discharge-hopper without weighing it.

The meter is inclosed within a casing, A, having a removable face to admit of access to the weighing mechanism, and the upper or feed hopper, B, is arranged centrally, or nearly so, under the top of the casing A. The hopper B is provided with an opening, C, on each side, just above its bottom, to allow the grain entering the mouth of hopper by a spout or otherwise to pass to either bucket of the meter. The openings C in the opposite sides of the hopper B have each a sliding gate, D, provided with a longitudinal rod, E, projecting beyond the ends of its gate, and passing through slots F in the balanced beams or levers G, centrally pivoted to the ends of the hopper on their outer faces, and are so constructed that when one gate is opened the other is closed. The hopper B is also provided with a flanged rectangular cap or spout, H, secured at its upper end to the top of the casing, and extending down into the hopper to protect a sleeve, hereinafter described, adapted to reciprocate between the inner faces of the hopper and the cap H. The bottom of the hopper B is also provided with openings I I, adapted to register with holes or openings J in a gate, K, sliding under the hopper, (see Fig. 3,) whereby if the weighing mechanism hereinafter described gets out of order the grain can pass through the machine between the weighing-buckets without being weighed.

L L represent the weighing-buckets, provided with lugs on their ends, which engage in holes in the ends of two balanced beams, M M, connected centrally by a rod, N, passing through the space between the weighing-buckets, through holes centrally arranged in the balanced beams M M, and through holes in two vibrating levers, O, hinged at their ends in the casing, and permanently joined together at their free ends by a bar, O', so as to form a bail, O O', connected by a link, P, with two scale-beams, Q Q', pivoted at their middle in hangers $x'$, (see Fig. 1,) depending from the casing, and also permanently joined together at their free ends by a bar, Q', so as to form a bail, Q Q'. By this construction it will be seen that the weighing-buckets are suspended from two balanced beams, M, supported on two vibrating levers, O, joined by a cross-bar, O', so as to form a bail, connected by a link, P, with two scale-beams, Q, joined at their outer ends by a bar, Q', so as to form a second bail, which bails O O' Q Q' guide the weighing-buckets as they are raised and lowered, and render the construction compact. The upper parts of the ends of each weighing-bucket are extended up beyond the mouth of the bucket, to form extensions $a'$, to prevent the grain from overflowing, and also to operate the gates in the feed-hopper by coming in contact with the ends of the longitudinal rod E, extending along the gate and raising the latter as the bucket is raised, so that when one bucket is raised it causes the gate of the feed-hopper immediately above it to rise, and by means of the balanced beams or levers G to close the opposite gate. The inner side of each weighing-bucket L is provided with an opening, R, regulated by a sliding gate, S, fitting over said opening, and provided with a longitudinal rod, T, passing through recesses U in vertical plates V, secured to opposite sides of the casing, and lying opposite each other. The longitudinal rod also passes through holes in the ends of levers V', pivoted to the vertical plates V, and provided with weights at their outer ends. By this construction, as a weighing-bucket is raised and the gate in the feeding-hopper is raised, the gate in the weighing-bucket is closed.

To the inner edge of each weighing-bucket is hinged a partition, W, provided with grain-openings X X near its upper ends, and holes Y, for the passage of one or more set-screws passing through the partition and resting against the back side of the weighing-bucket, so that the capacity of the space above the partition in the weighing-bucket can be regulated as desired, so as to cause grain entering the raised bucket to bank up against the gate in the hopper, and prevent or retard the inflow of grain from the hopper into the weighing-bucket at the weighing-point, so that an amount of grain over the desired weight will not run into the bucket, and by means of the holes in and space behind the partition the flow of grain will continue until a sufficient quantity is in the weighing-bucket to overbalance the weight on the weighing-beam and allow the weighing-bucket to fall to its place at the bottom and the other weighing-bucket to be raised. One of the balanced beams M is provided with an arm, Z, extending at right angles from the beam at its middle point.

To the arm Z is adjustably secured a slotted arm, $a$, provided with an enlarged curved head, that can be adjusted by set-screws to bear against a friction-roller, $b$, journaled in the flanges $c$ of a plate secured to the frame A.

$d\ d$ represent gravity pawls or stops pivoted in the flanges $c$, and having their inner ends heaviest.

The function of the roll $b$ is merely that of a friction-roll, decreasing the friction on the head of the arm $a$ in its oscillations. As a bucket, L, is raised and receiving grain, its arm $a$ is inclined, and the curved end of one of the gravity stops or pawls $d$ (see Fig. 2) bears against the enlarged end of the arm $a$, holding it until the arm $a$ sinks from the weight of grain discharged into the bucket and becomes disconnected from the stop or pawl $d$, and the opposite bucket L rises and the arm $a$ becomes reversely inclined and held in that position by the opposite stop or pawl, $d$.

The delivery-hopper $e$ is arranged directly below the weighing-buckets to receive all the grain discharged from them, and is pivoted on each side in its central line to a vibrating bail, $h$. The opposite side arms of the bail $h$ are provided with recesses, which rest upon a rod, $x^2$, (see Fig. 1,) secured at each end to the sides of the casing, so that the delivery-spout $e$ is pivoted to the casing by means of the bail $h$ and rod $x^2$. The handle of the bail $h$ is connected by a long counterbalance-weight, $h'$, to an upper bail, $i$, pivoted in brackets $k$, depending from the under face of the top of the casing, the ends of the arms of the bail $i$ being pivoted to a rectangular-shaped sleeve, $l$, having a vertically-reciprocating movement in the feed-hopper between its inner face and the cap or spout H, and closing the side openings, C, in the feed-hopper B, to prevent the outflow of grain from the latter when the delivery-hopper is too full. The delivery-hopper $e$ is provided with a discharge-opening, $m$, and the counterbalance-weight may be increased or diminished, as found necessary.

What we claim as our invention is—

1. In a grain-meter, the combination, with the weighing-buckets L L, suspended from the opposite ends of two balanced beams, M M, connected together by a central rod, N, of the hinged bail O O', bail scale-beam Q Q', pivoted in hangers $x'$, and link P, said buckets being arranged within the bails, which latter serve as guides to the buckets as they are raised and lowered, substantially as described.

2. The combination, with the feed-hopper B, provided with the openings C, of the sliding gates D, each provided with a longitudinal rod, E, projecting beyond the ends of the gate, and balanced beams G, the latter being pivoted to the ends of the hopper, substantially as described.

3. The combination, with the feed-hopper B, having openings C, of the sliding gates D, each having a rod, E, balanced beams G, and weighing-buckets L', having extensions $a'$, substantially as described.

4. In a grain-meter, the plate $c$, having downwardly-projecting flanges, a friction-roll, $b$, journaled at the middle of said flanges, and stops $d\ d$, arranged between the flanges and on opposite sides of the friction-roll, substantially as described.

5. The combination, with the balanced beams M M, from which the weighing-buckets are suspended, and arm Z, of the adjustable slotted arm $a$, friction-roll $b$, and stops $d$, substantially as described.

6. The combination, with the feed-hopper B, provided with openings C, and a cap or spout, H, of the reciprocating cut-off or sleeve $l$, sliding between the cap and inner faces of the hopper, substantially as described.

7. The combination, with the feed-hopper B, provided with openings C, of the discharge-hopper $e$, pivoted to the vibrating bail $h$, counterbalance-weight $h'$, pivoted bail $i$, and sleeve $l$, substantially as described.

8. The combination, with the weighing-bucket L, provided with the opening R, and sliding gate S, having rod T, of the vertical plates V, secured to opposite sides of the casing, and provided with recesses U, and weighted levers V', substantially as described.

9. The combination, with the feed-hopper B, provided with the openings C, sliding gates D, having rods E and balanced beam G, and the buckets L, each provided with an opening, R, and sliding gate S, of the vertical plates V, having recesses U, and weighted levers V', whereby, when a bucket is raised, the sliding gate in the feed-hopper is raised and the gate in the lower end of the bucket closed, to prevent the egress of the grain from the lower end of the bucket, substantially as described.

10. The weighing-bucket L, provided with an opening, R, sliding gate S, and hinged adjustable partition W, having grain-openings X X, substantially as described.

11. The combination, with the weighing-bucket L, provided with the hinged adjustable partition W, having grain-openings X, of the feed-hopper B, provided with the openings C, substantially as described.

12. The combination, with the hopper B, provided with openings I I in its bottom, of the sliding gate K, provided with openings, weighing-buckets L, arranged on each side of the feed-hopper, with an open space between them, and delivery-hopper $e$, provided with the discharge-opening $m$, substantially as described.

REUBEN RODNEY JAMES.
MIRABEAU NORMAN LYNN.

Witnesses:
  WILL W. WILLIAMS,
  JOSEPH B. PEPPER.